US008547247B1

(12) United States Patent
Haddy

(10) Patent No.: US 8,547,247 B1
(45) Date of Patent: *Oct. 1, 2013

(54) DETECTING, LOCATING AND TRACING OF BURIED ASSETS USING DISTRIBUTED PROCESSING OVER COMMUNICATIONS NETWORKS

(71) Applicant: Alan Haddy, Naples, FL (US)

(72) Inventor: Alan Haddy, Naples, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/656,698

(22) Filed: Oct. 20, 2012

Related U.S. Application Data

(63) Continuation-in-part of application No. 13/543,612, filed on Jul. 6, 2012, now Pat. No. 8,358,201.

(51) Int. Cl.
*G08B 5/22* (2006.01)

(52) U.S. Cl.
USPC ..................................... 340/870.21

(58) Field of Classification Search
USPC ................. 702/130; 340/572.1, 540, 870.21; 455/419
See application file for complete search history.

(56) References Cited

U.S. PATENT DOCUMENTS

| 6,144,848 | A * | 11/2000 | Walsh et al. .................. 455/419 |
| 6,850,161 | B1 * | 2/2005 | Elliott et al. ................ 340/572.1 |
| 7,400,976 | B2 | 7/2008 | Young |
| 7,834,806 | B2 | 11/2010 | Tucker |
| 7,889,124 | B2 | 2/2011 | Islam |
| 8,081,112 | B2 | 12/2011 | Tucker |
| 8,144,058 | B2 | 3/2012 | Sawyer |
| 2006/0077095 | A1 | 4/2006 | Tucker |
| 2006/0085133 | A1 | 4/2006 | Young |
| 2008/0125942 | A1 | 5/2008 | Tucker |
| 2009/0254407 | A1 | 10/2009 | Fagan |
| 2010/0131903 | A1 | 5/2010 | Thomson |
| 2010/0189312 | A1 | 7/2010 | Nielsen |
| 2010/0207816 | A1 | 8/2010 | Islam |
| 2011/0191058 | A1 * | 8/2011 | Nielsen et al. ................ 702/130 |
| 2011/0241936 | A1 | 10/2011 | Sawyer |

OTHER PUBLICATIONS

Shaner, Jeff, Mapping Underground Assets using ArcGIS for Windows Mobile, ArcGIS Resource Center, downloaded from http://blogs.esri.com/, on Sep. 5, 2012.

* cited by examiner

*Primary Examiner* — Steven Lim
*Assistant Examiner* — Kaleria Knox
(74) *Attorney, Agent, or Firm* — Mark Terry

(57) ABSTRACT

A method on a mobile computing device for detecting, locating and tracing buried assets, is provided. The method includes reading, from one or more sensors communicatively coupled with the mobile computing device, a plurality of analog radio frequency signals from a buried asset, and amplifying the plurality of analog signals. The method further includes converting the analog signals to a plurality of digital signals, encoding the digital signals for transmission, so as to produce a plurality of encoded digital signals, and transmitting the plurality of encoded digital signals to a server via a communications network. The method further includes receiving, from the server, buried asset data including depth measurement data and electrical current measurement data for one or more buried assets, wherein the buried asset data corresponds to the analog radio frequency signals, and displaying the buried asset data in a graphical user interface of the mobile computing device.

17 Claims, 12 Drawing Sheets

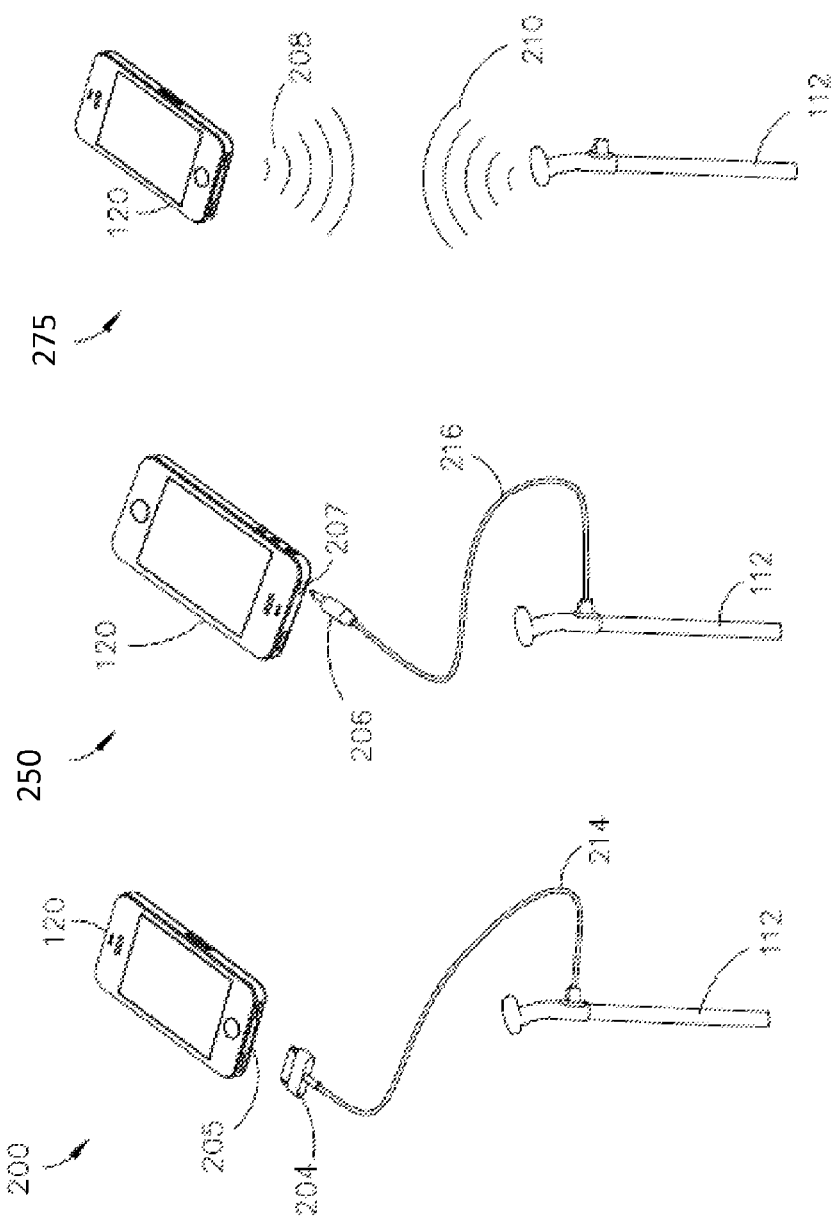

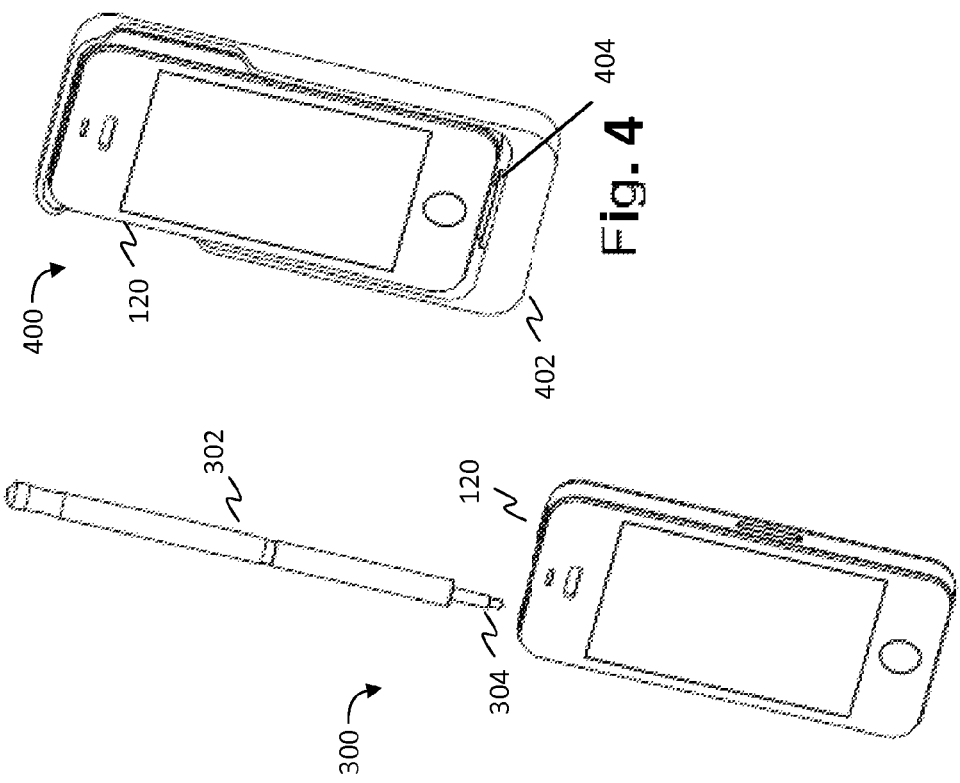

DETECTING, LOCATING AND TRACING OF BURIED ASSETS USING DISTRIBUTED PROCESSING OVER COMMUNICATIONS NETWORKS

CROSS-REFERENCE TO RELATED APPLICATIONS

This patent application is a continuation in part of, and claims priority to, patent application Ser. No. 13/543,612 filed Jul. 6, 2012 and entitled "Storage and Recall of Buried Asset Data Over Communications Networks for Damage Avoidance and Mapping." The subject matter of patent application Ser. No. 13/543,612 is hereby incorporated by reference in its entirety.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

TECHNICAL FIELD

The technical field relates generally to the detection and identification of buried assets (i.e., underground utility lines) and, more specifically, to processes for processing, storing, maintaining and utilizing buried asset data and signals over telecommunications networks.

BACKGROUND

Utility lines, such as lines for telephones, electricity distribution, natural gas, cable television, fiber optics, Internet, traffic lights, street lights, storm drains, water mains, and wastewater pipes, are often located underground. Utility lines are referred to as "buried assets" herein. Consequently, before excavation occurs in an area, especially an urban area, an excavator is typically required to clear excavation activities with the proper authorities. The clearance procedure usually includes contacting a central authority that in turn notifies the appropriate utility companies. Subsequently, each utility company must perform a buried asset detection procedure, which includes visiting the excavation site, detecting the relevant buried assets and physically marking the position of the buried asset using temporary paint or flags. Upon completion of this procedure by the appropriate utility companies, excavation can occur with the security that buried assets will not be damaged.

A variety of problems are associated with the device typically used for collecting buried asset data. Usually, a technician visiting a proposed excavation site utilizes a device called a conventional locator—a commercial, off-the-shelf, utility locator that detects and identifies buried assets using radio frequency and/or magnetic sensors. Because a conventional locator device includes processing units for executing complex signal processing algorithms, which may include multiple circuit cards, locators can be expensive, bulky and unreliable. Further, once a locator has been purchased and fielded, its processing speed, and the algorithms it executes, are fixed and do not stay up to date with current processing speeds and advances in signal processing. Considering the fast rate at which processing speeds increase and algorithms become more efficient, locators can quickly become outdated. Thus, a locator that is considered "state of the art" with advanced features and functions on the date of its purchase, may be considered outdated and slow in a relatively short period of time.

Conventional locators (commonly known as "pipe or cable locator receivers") are portable, self-contained electronic devices carried by a field operator who walks over the target pipe or cable and receives an electromagnetic or acoustic signal from the buried conductor. A transmitter in the locator applies a signal to the buried asset. The locator includes detection antenna arrays, signal processing hardware and software, a display screen and power supply management circuits. The locator's display screen displays position and depth information to the operator. A plethora of hardware, such as digital signal processing circuits, displays, and power management circuits increase the complexity of a locator, increase the cost of manufacturing, reduce reliability and consequently increase the sales price of a locator. For this reason, it can be cost prohibitive for organizations that require large numbers of locators for their workforce to purchase the number of locators they require.

Therefore, a need exists for improvements over the prior art, and more particularly for methods and systems that reduce the complexity, usability and costs of devices and systems that detect buried asset data for excavation sites, while allowing such methods and systems to leverage advances in hardware and software.

SUMMARY

A method and system that facilitates collection and storage of buried asset data on a mobile computing device communicatively coupled with a communications network is provided. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, a method on a mobile computing device for generating buried asset data, the mobile computing device communicatively coupled with a communications network, is provided that solves the above-described problems. The method includes reading, from one or more sensors communicatively coupled with the mobile computing device, a plurality of analog radio frequency signals from a buried asset, and amplifying the plurality of analog signals so as to increase amplitude of the analog signals. The method further includes converting the plurality of analog signals to a plurality of digital signals, encoding the plurality of digital signals for transmission over the communications network, so as to produce a plurality of encoded digital signals, and transmitting the plurality of encoded digital signals to a server via the communications network. The method further includes receiving, from the server via the communications network, buried asset data including depth measurement data and electrical current measurement data for one or more buried assets, wherein the buried asset data corresponds to the plurality of analog radio frequency signals that were read, and displaying the buried asset data from the server in a graphical user interface of the mobile computing device.

BRIEF DESCRIPTION OF THE DRAWINGS

The accompanying drawings, which are incorporated in and constitute a part of this disclosure, illustrate various example embodiments. In the drawings:

FIGS. 2A through 2C are illustrations various embodiments of antenna array systems for detection, collection and storage of buried asset data;

FIG. 3 is an illustration of another embodiment of an antenna array system for detection, collection and storage of buried asset data;

FIG. 4 is an illustration of yet another embodiment of an antenna array system for detection, collection and storage of buried asset data;

DETAILED DESCRIPTION

Figure 1:
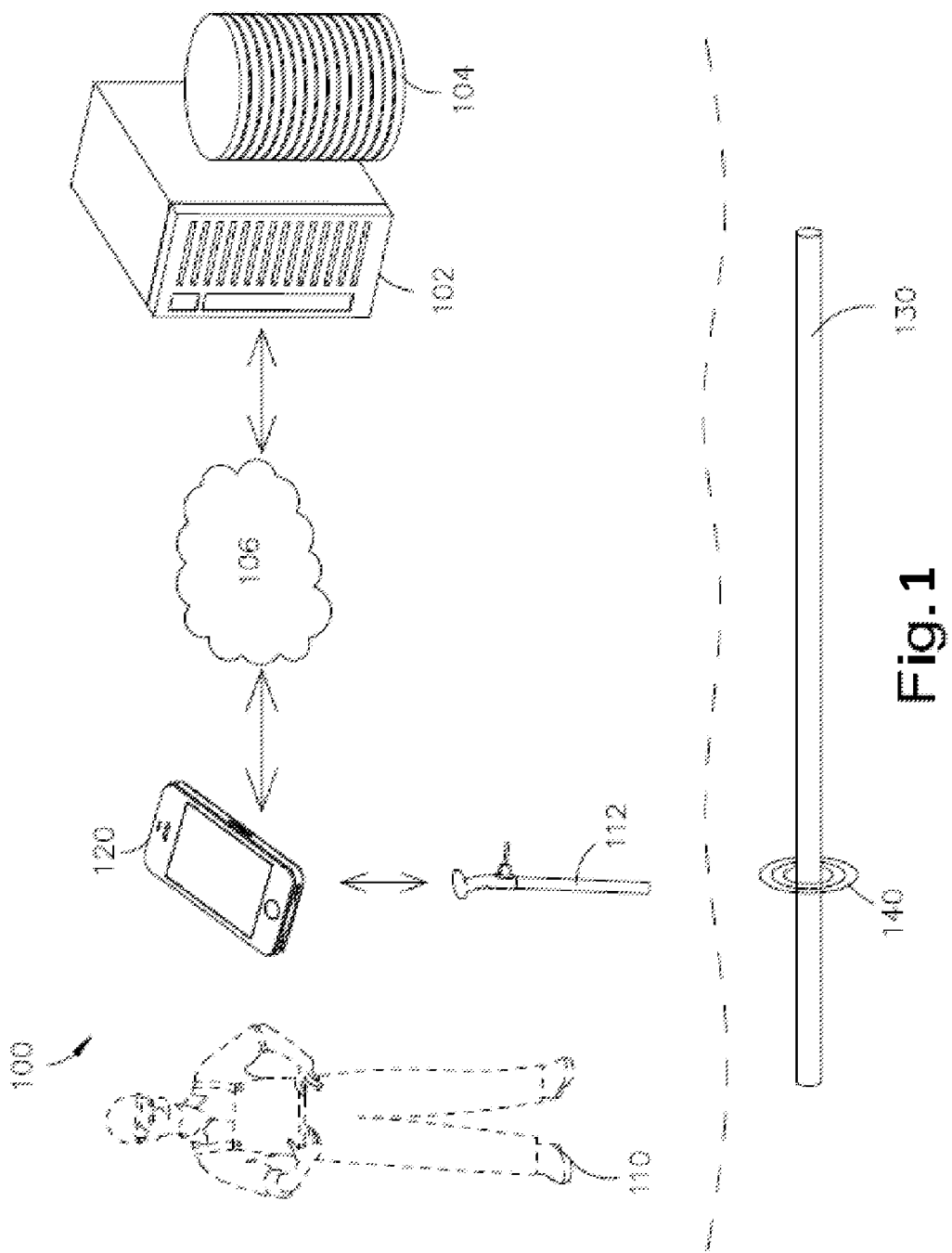
FIG. 1 is a diagram of an operating environment that supports a process for facilitating detection, collection and storage of buried asset data on a server communicatively coupled with a communications network, according to an example embodiment.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

The present invention improves over the prior art by providing lower cost buried asset detection devices and systems, by leveraging the availability of mobile computing devices and mobile broadband network connections. In one embodiment, the present invention allows for the processing burden of buried asset detection to be transferred to the cloud, i.e., a remote server, via a mobile computing device having a network connection. This decreases the cost of a mobile and portable buried asset detection system and allows the system to take advantage of advances in current processing speeds and signal processing, thereby eliminating or reducing the chances that a buried asset detection system becomes outdated. The present invention further leverages a user's mobile computing device and its network connection. This decreases the cost of a portable buried asset detection system and allows the system to take advantage of a user's own upgrading of his mobile computing device. Also, the present invention provides a buried asset detection system that weighs less than, and is more ergonomic than, conventional locator devices.

The present invention further improves over the prior art by providing systems and methods that allow for the re-use of prior buried asset detection activities. The present invention allows technicians performing standard buried asset detection procedures on a proposed excavation site to view prior buried asset data about the same site on a mobile computing device. This data guides the technician to the position of buried assets, thereby reducing the amount of time and resources spent detecting the buried assets. Lastly, the present invention allows the technician to upload the current buried asset data he has garnered at the proposed excavation site, which may be used in future buried asset detection activities at the same site.

FIG. 1 is a diagram of an operating environment 100 that supports a process for facilitating detection, collection and storage of buried asset data on a server 102 communicatively coupled with a communications network 106, according to an example embodiment. The environment 100 may comprise a mobile computing device 120, which may communicate with server 102 via a communications network 106. Mobile computing device 120 may comprise a cellular telephone, smart phone or tablet computer. Device 120 may also comprise other computing devices such as desktop computers, laptops, and game consoles, for example. The mobile computing device 120 may be connected either wirelessly or in a wired or fiber optic form to the communications network 106. Communications network 106 may be a packet switched network, such as the Internet, or any local area network, wide area network, enterprise private network, cellular network, phone network, mobile communications network, or any combination of the above.

The environment 100 shows that mobile computing device 120 is operated by a technician 110 and includes an antenna array 112, which may be communicatively coupled, either wirelessly or in a wired or fiber optic form, to the mobile computing device 120. As such, units 120 and 112 may each comprise a computing device 1100, described below in greater detail with respect to FIG. 11. FIG. 1 shows that antenna array 112 detects radio frequency and/or magnetic signals 140 emanating from a buried asset 130.

Server 102 includes a software engine that delivers applications, data, program code and other information to networked devices 120. The software engine of server 102 may perform other processes such as transferring multimedia data in a stream of packets that are interpreted and rendered by a software application as the packets arrive. FIG. 1 further shows that server 102 includes a database or repository 104, which may be a relational database comprising a Structured Query Language (SQL) database stored in a SQL server. Mobile computing device 120 may also each include databases. The database 104 may serve buried asset data, as well as related information, used by server 102 and mobile computing device 120 during the course of operation of the invention.

Server 102, mobile computing device 120 and antenna array 112 may each include program logic comprising computer source code, scripting language code or interpreted language code that perform various functions of the present invention. In one embodiment, the aforementioned program logic may comprise program module 1107 in FIG. 11. It should be noted that although FIG. 1 shows only one mobile computing device 120 and one server 102, the system of the present invention supports any number of servers and mobile computing devices connected via network 106. Also note that although server 102 is shown as a single and independent entity, in one embodiment, server 102 and its functionality can be realized in a centralized fashion in one computer system or in a distributed fashion wherein different elements are spread across several interconnected computer systems.

Environment 100 may be used when a mobile computing device 120 engages in buried asset detection activities that comprise reading, generating, and storing buried asset in database 104 coupled to server 102. Various types of data may be stored in the database 104 of server 102. For example, the database 104 may store one or more records for each location, i.e., a location record. A location record may include location data, such as latitude and longitude coordinates, an altitude coordinate, a current time, a textual map address, or the like. A location record may also include a list of buried asset data, wherein each buried asset data item may be defined by its depth, position, electrical signal measurement (such as current, resistance, impedance, magnitude, frequency, voltage, etc.), direction and orientation.

A location record may further include one or more images (i.e., photographs) of the physical area of the location. In one embodiment, an image of a physical area corresponding to a location comprises one or more surface markings indicating a position of the one or more buried assets. Markings may include colored or uncolored solid lines, dotted lines, circles, squares, flags, arrows, objects, text or other visual indicia in the image that indicate the actual location of a buried asset. A solid yellow line, for example, may be used in an image of a physical area corresponding to a location in order to indicate the presence of a buried asset in the actual location of the solid yellow line. Lastly, a location record may include other data, such as the name or unique identifier for the technician that created the location record, a time/date stamp indicating a creation and/or modification date of the location record, etc.

FIGS. 2A through 2C are illustrations various embodiments of antenna array systems for detection, collection and storage of buried asset data. FIG. 2A shows a first embodiment of a system 200 for detection, collection and storage of buried asset data. FIG. 2A shows a wired element 214 emanating from antenna array 112 and terminating in a plug 204, such as a dock connector plug. The mobile device 120 has a corresponding socket 205, such as a dock connector port. Thus, the plug 204 is inserted into the socket 205, thereby communicatively coupling the antenna array 112 to the mobile computing device 120 via the dock connector port 205 of the mobile computing device 120. A dock connector port is a data port used to attach a mobile electronic device to one or more external resources. The port may carry a variety of signals and power.

FIG. 2B shows a second embodiment of a system 250 for detection, collection and storage of buried asset data. FIG. 2B shows a wired element 216 emanating from antenna array 112 and terminating in a plug 206, such as a TRS or TRRS plug. The mobile device 120 has a corresponding socket 207, such as a TRS or TRRS socket. Thus, the plug 206 is inserted into the socket 207, thereby communicatively coupling the antenna array 112 to the mobile computing device 120 via the socket 207 of the mobile computing device 120. A TRRS connector port is a data port used for analog signals including audio. The TRRS port is also termed an audio jack, phone jack, phone plug, and jack plug.

FIG. 2C shows a third embodiment of a system 275 for detection, collection and storage of buried asset data. FIG. 2C shows an example embodiment wherein the antenna array 112 is communicatively coupled to the mobile computing device 120 via a radio frequency (RF) connection. FIG. 2C shows that signals 210 are transmitted from antenna array 112 and received by device 120, and RF signals 208 are transmitted by device 120 and received by antenna array 112. In this example embodiment, both antenna array 112 and device 120 both include an RF transmitter/receiver, such as a Bluetooth transmitter/receiver. Bluetooth is a proprietary open wireless technology standard for exchanging data over short distances using short-wavelength radio frequency transmissions from 2400-2480 MHz. In one embodiment, the antenna array 112 may comprise one or more multichannel antennas or sensor arrays for multiple orientations, which are described in more detail in FIG. 6 below.

FIG. 3 is an illustration of another embodiment of an antenna array system 300 for detection, collection and storage of buried asset data. FIG. 3 shows that system 300 includes the mobile device 120 and a pencil shaped antenna array 302. In this embodiment, the antenna array 302 comprises a small cylinder terminating in terminating in a plug 304, such as a TRS or TRRS plug. The mobile device 120 has a corresponding socket such that the plug 304 is inserted into the socket, thereby communicatively coupling the antenna array 302 to the mobile device 120. Note that antenna array 302 is small and portable, thereby allowing the user to easily handle the mobile device 120 in a regular manner.

FIG. 4 is an illustration of yet another embodiment of an antenna array system 400 for detection, collection and storage of buried asset data. FIG. 4 shows that system 400 includes the mobile device 120 and an antenna array 402 shaped like a slightly larger mobile phone cover. In this embodiment, the antenna array 402 comprises a portion of a housing or cover with a dock connector plug 404. The mobile device 120 has a corresponding socket into which the plug 404 is inserted, thereby communicatively coupling the antenna array 402 to the mobile computing device 120. Again, note that the size and shape of the antenna array 402 allows the user to easily handle the mobile device 120 in a regular manner.

The construction of the systems 200-400 are advantageous in that they leverage the use of a smart phone or mobile phone, which is ubiquitous in today's society. Thus, a typical consumer need only purchase the antenna array 112 (or 302 or 402) to gain access to a portable buried asset locating system. This reduces the cost of obtaining a portable buried asset locating system for a consumer. Additionally, the systems 200-400 are advantageous in that they take advantage of the fact that consumers typically update their smart phones or mobile phones frequently (every 22 months, according to recent studies), thereby affording the systems 200-400 access to increased processing speeds and improved processing algorithms available in newer models. This also reduces or eliminates the chances that the systems 200-400 become quickly outdated. Also, systems 200-400 weigh less than, and are more ergonomic than, conventional locator devices.

Figure 5:
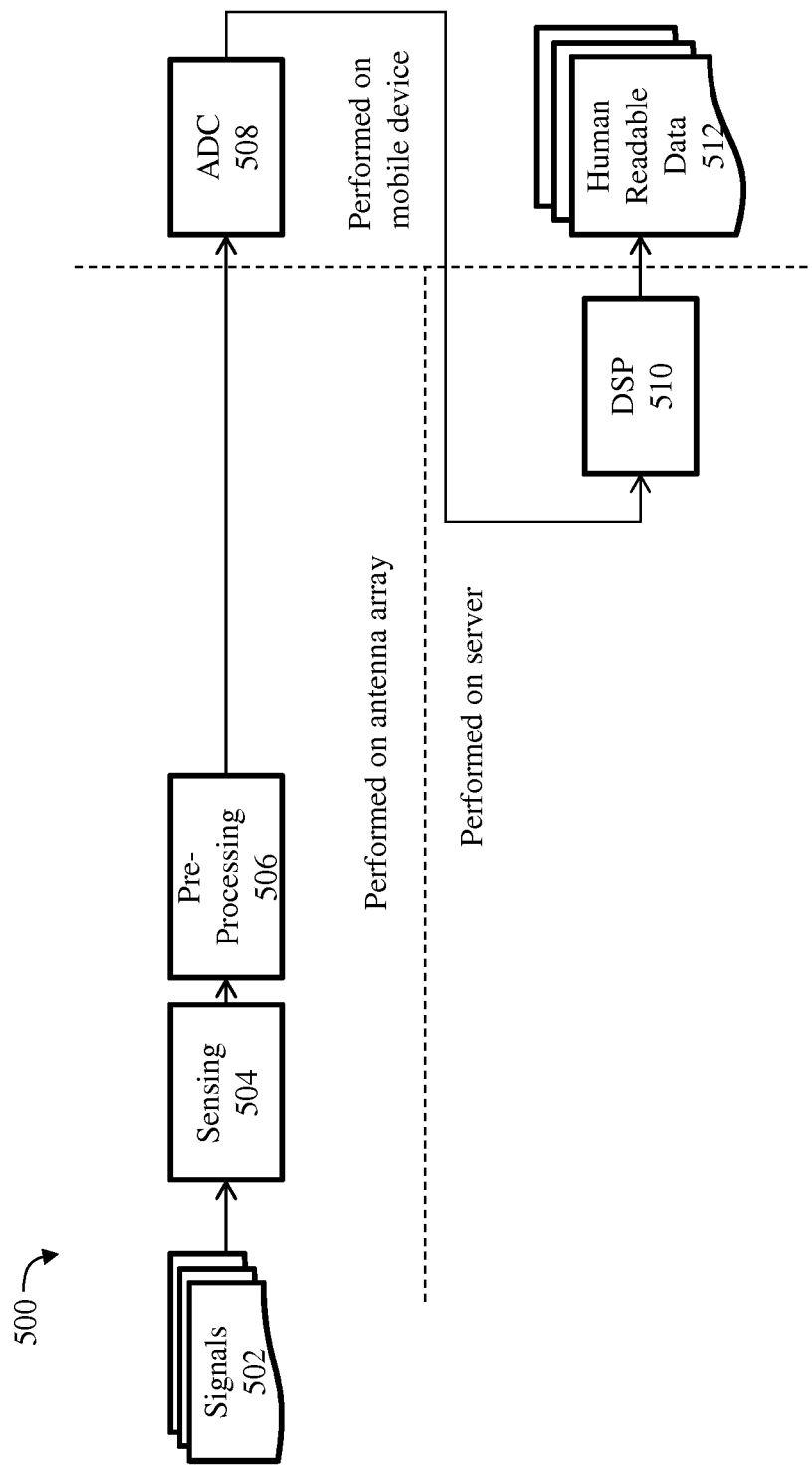
FIG. 5 is a block diagram showing the overall functions performed by a system for detecting, collecting and storing buried asset data, according to an example embodiment.

FIG. 5 is a block diagram 500 showing the overall functions performed by a system for detecting, collecting and storing buried asset data, according to an example embodiment. FIG. 5 shows how a device or system, such as systems 200-400, detect and collect signal data from a buried asset, process the signal data and generate a final sensor reading that may be displayed for a technician 110 to view. The process starts with the emanation of raw analog signals 502 (see also 140 in FIG. 1) by a buried asset (see 130 in FIG. 1), such as an underground communications cable. The signals 502 may include RF signals, magnetic field readings, or the like. Next, a sensing process 504, which may be implemented by antenna array 112, reads the signals 502, which undergo pre-processing 506.

In one embodiment, pre-processing 506 may include pre-amplification processes, signal filtering processes, amplification processes or any combination of the above. A pre-amplification process may be a preamplifier (or "preamp"), which is an electronic amplifier that prepares a small signal for further amplification or processing. A pre-amplification process may alternatively be implemented fully in computer program logic or software. A signal filtering process removes unwanted components, such as noise or interfering signals. A signal filtering processing may be implemented by a dedicated circuit. An amplification process increases the amplitude of a small signal for further processing. An amplification process may also be implemented by a dedicated circuit.

Next, the signals 502 are converted into digital form by an analog to digital converter (ADC) process 508, which may be implemented by an electronic circuit that converts continuous signals to discrete digital numbers. The ADC process 508 may alternatively be implemented fully in computer program logic or software. Subsequently, the digital form of the signals 502 may undergo digital signal processing (DSP) 510, which may be performed by a specialized microprocessor with an architecture optimized for digital signal processing. The DSP process 510 may alternatively be implemented fully in computer program logic or software. In one embodiment, the DSP process 510 may comprise a DSP quadrature mixer resulting in a sum and difference representation of an input data signals. Consequently, the DSP process 510 filters the data signal to remove the sum components and rectangular to polar conversion produces a magnitude and phase representation of the original input signal.

The final result of diagram 500 is a sensor reading or human readable data 512, which may comprise human readable buried asset data, as defined above. The human readable data 512 may subsequently be displayed on a screen or other computer display, such as on device 120.

Note that the dotted lines and related text of diagram 500 indicate which devices of environment 100, in one embodiment, perform the processes of diagram 500. Antenna array 112 performs the sensing and pre-processing processes 504 and 506, which the mobile device 120 performs the ADC process 508 and the server 102 performs the DSP process 510.

Figure 6A:
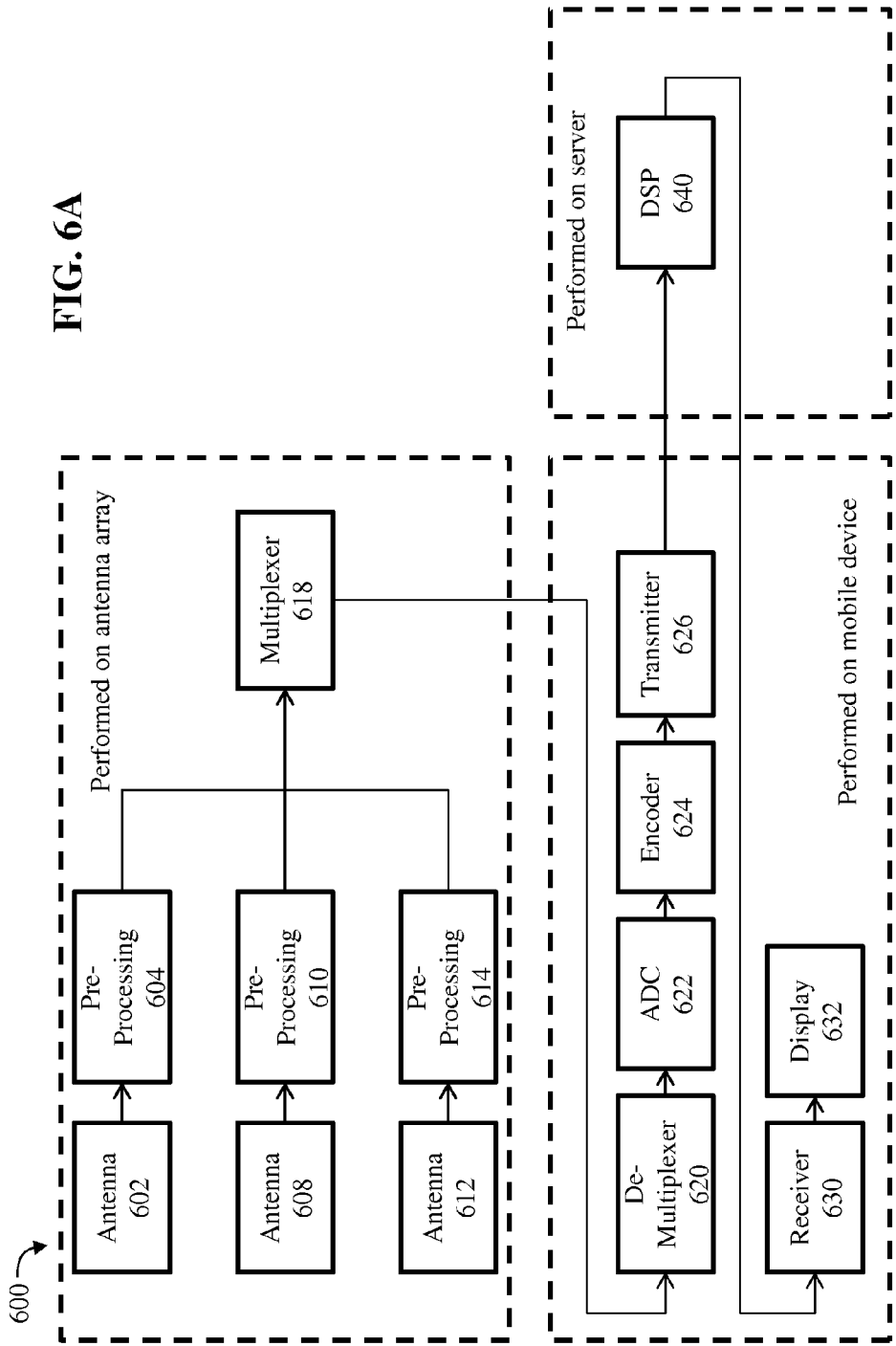
FIG. 6A is a block diagram showing the components of a system for detecting, collecting and storing buried asset data, according to an example embodiment.

FIG. 6A is a block diagram showing the components of a system 600 for detecting, collecting and storing buried asset data, according to an example embodiment. The device 600 corresponds to the systems 200-400 for detecting signal data from a buried asset, processing the signal data and generating a final sensor reading. The components of the device 600 are shown in relation to the diagram 500 above.

FIG. 6A shows that the device 600 includes three channels or antennas 602, 608, 612, which may comprise a top antenna, a vertical antenna (oriented perpendicularly to the top antenna) and a bottom antenna (oriented in parallel to the top antenna). The antenna 602 is communicatively coupled to a pre-processing module 604, which may be implemented as a dedicated circuit. The pre-processing module 604 may perform any of the processes described for the pre-processing step 506 defined above. Likewise, the antenna 608 is communicatively coupled to a pre-processing module 610, and the antenna 612 is communicatively coupled to a pre-processing module 614.

Subsequently, the pre-processing modules 604, 610 and 614 are communicatively coupled to a multiplexer 618, which is a device that selects one of several input signals and forwards the selected input into a single line. The multiplexer 618 may be implemented as a digital circuit. The purpose of the multiplexer 618 is to allow for the transmittal of multiple channels of data from the multiple antennas 602, 608, and 612 to the device 120 over a single communications line, such as the microphone input channel of an audio jack input. A multiplexer is often used with a complementary de-multiplexer on the receiving end.

Next, the data from the multiplexer 618 is de-multipexed by a de-multiplexer 620, which is a device that takes a single input signal and selects one of many data-output lines connected to the single input. Following, an analog to digital converter 622 converts the data received from analog to digital format, and an encoder 624 encodes the data from the converter 622 for transmission. An encoder is a device, circuit, transducer, software program, or algorithm or person that converts information from one format or code to another, for the purposes of transmitting the information efficiently over a telecommunications line. Next, the transmitter 626 of device 120, which may be a radio frequency transmitter, transmits the data encoded by encoder 624 to server 102 over network 106.

Then, a digital signal processor (DSP) 640 of the server 102 performs digital signal processing 510 on the digitally formatted data that was transmitted by transmitter 626. The server 102 transmits the processed data back to the device 120, which receives the data via a receiver 630, which may be a radio frequency receiver. The data received is a sensor reading or human readable data 512, which may subsequently be displayed on a screen or other computer display 632, such as on device 120.

Note the dotted lines and related text of FIG. 6A indicate the locations of the components described. In one embodiment, the components 602 through 618 reside on the antenna array 112, while the components 620 through 632 reside on the mobile device 120. Finally, the DSP 640 resides on the server 102.

Figure 6B:
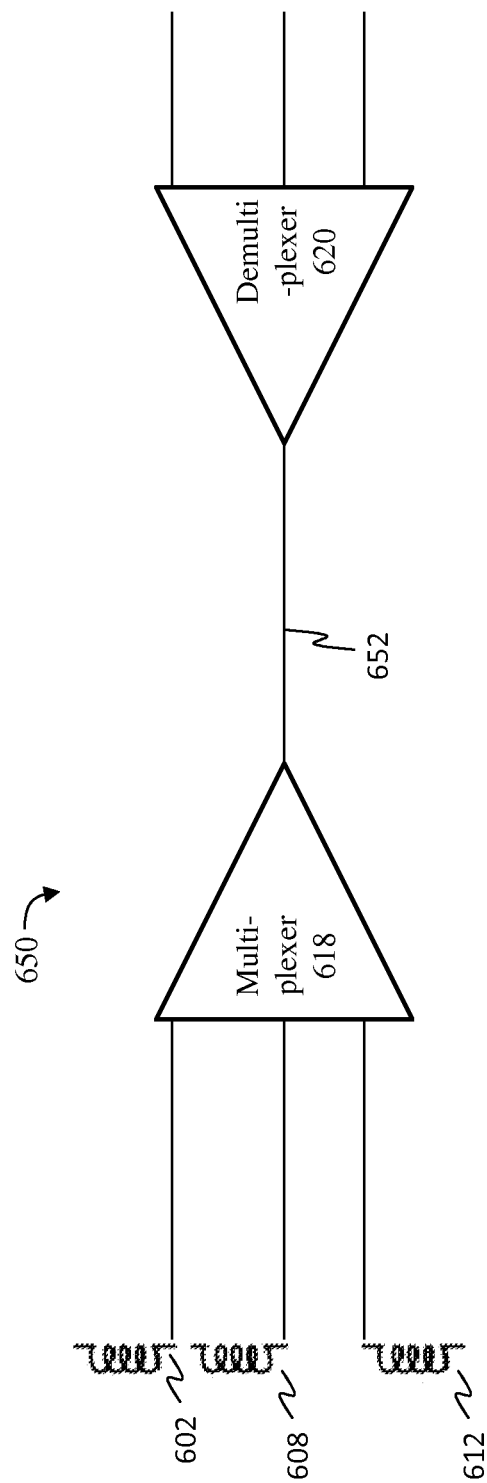
FIG. 6B is a diagram showing one embodiment of the multiplexing and de-multiplexing processes of the present invention, according to an example embodiment.

FIG. 6B is a diagram 650 showing one embodiment of the multiplexing processes described in FIG. 6A above. FIG. 6B may be implemented in a system, such as system 250 or 300, wherein multiple signals are gathered by the antenna array 112 (or 302) and are input into the device 120 via a single channel, such as the single input line available via a TRRS connection. FIG. 6B shows one embodiment wherein the device 600 implements a time-division multiplexing (TDM) process, wherein three data streams or signals are transferred apparently simultaneously as sub-channels via one communication channel. FIG. 6B shows that three separate signals are obtained by the antennas 602, 608 and 612 of the device 600. Subsequently, the three signals are processed via the multiplexer 618 for transmission over the single communications channel 652 (e.g., the single input line available via a TRRS connection). Subsequently, FIG. 6B shows that the de-multiplexer 620 receives the data from the multiplexer 618 and de-multiplexes the data into three separate and distinct signals, corresponding to the original signals obtained by the antennas 602, 608 and 612.

Figure 6C:
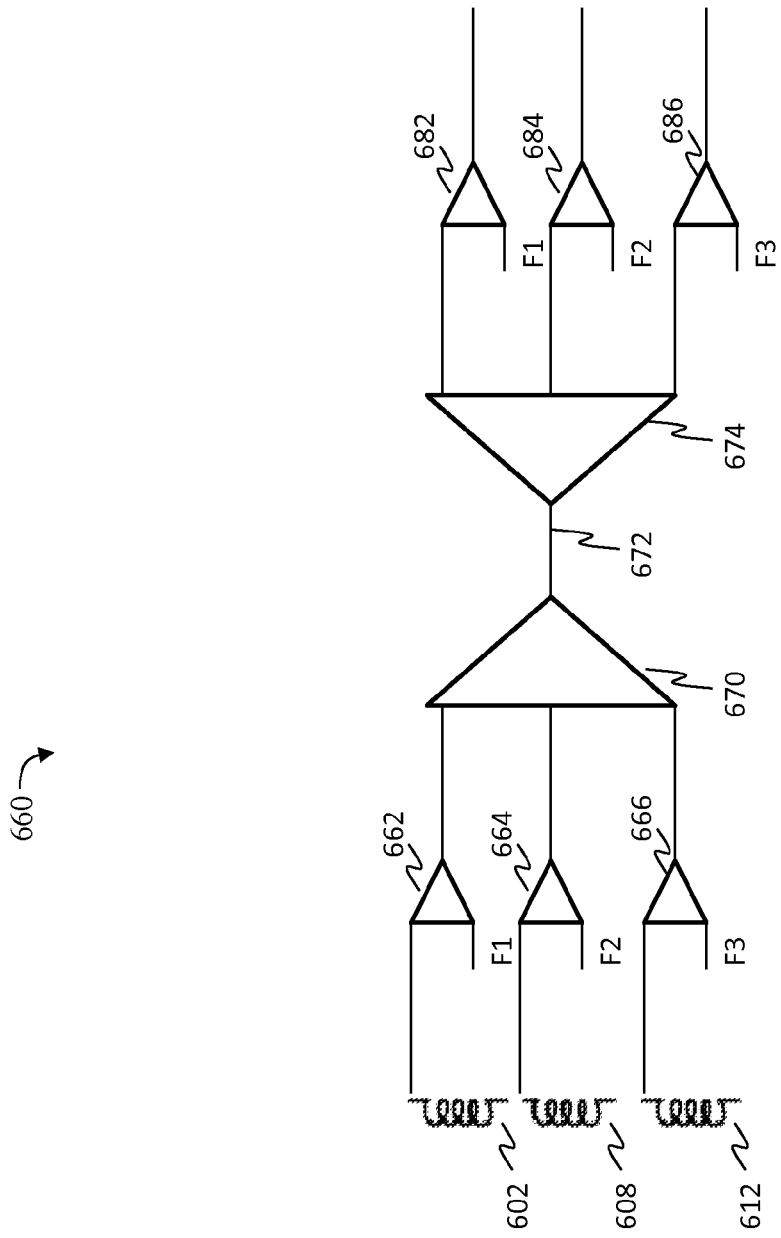
FIG. 6C is a diagram showing another embodiment of the multiplexing and de-multiplexing processes of the present invention, according to an example embodiment.

FIG. 6C is a diagram 660 showing another embodiment of the multiplexing processes described in FIG. 6A above. FIG. 6B may also be implemented in a system, such as system 250 or 300, wherein multiple signals are gathered by the antenna array 112 and are input into the device 120 via a single channel. FIG. 6C shows one embodiment wherein the device 600 implements a frequency-division multiplexing (FDM) process, wherein the total bandwidth available in a communication medium is divided into a series of non-overlapping frequency sub-bands, each of which is used to carry a separate signal. This allows a single transmission medium (e.g., the single input line available via a TRRS connection) to be shared by multiple signals.

FIG. 6C shows that three separate data signals are obtained by the antennas 602, 608 and 612 of the device 600. Subsequently, each of the three data signals are processed at a separate modulator circuit, which combines a data signal with a carrier signal (each of different frequency). Thus, the data signal from antenna 602 is combined with the carrier signal "F1" at the modulator circuit 662, the data signal from antenna 608 is combined with the carrier signal "F2" at the modulator circuit 664, and the data signal from antenna 612 is combined with the carrier signal "F3" at the modulator circuit 666.

Next, the resulting signals are combined 670, transmitted over a single communications channel 672 and received by filter 674. Consequently, filter 674 separates the combined signals into its constituent components (i.e., three modulated signals) based on the carrier signals. Subsequently, the constituent signals are de-modulated in reverse of the manner in which the signals was previously modulated. Thus, the first signal is combined with the carrier signal "F1" at the de-modulator circuit 682, the second signal is combined with the carrier signal "F2" at the de-modulator circuit 684, and the third signal is combined with the carrier signal "F3" at the de-modulator circuit 686. Subsequently, FIG. 6C shows the result being three separate and distinct signals, corresponding to the original signals obtained by the antennas 602, 608 and 612.

Figure 7:
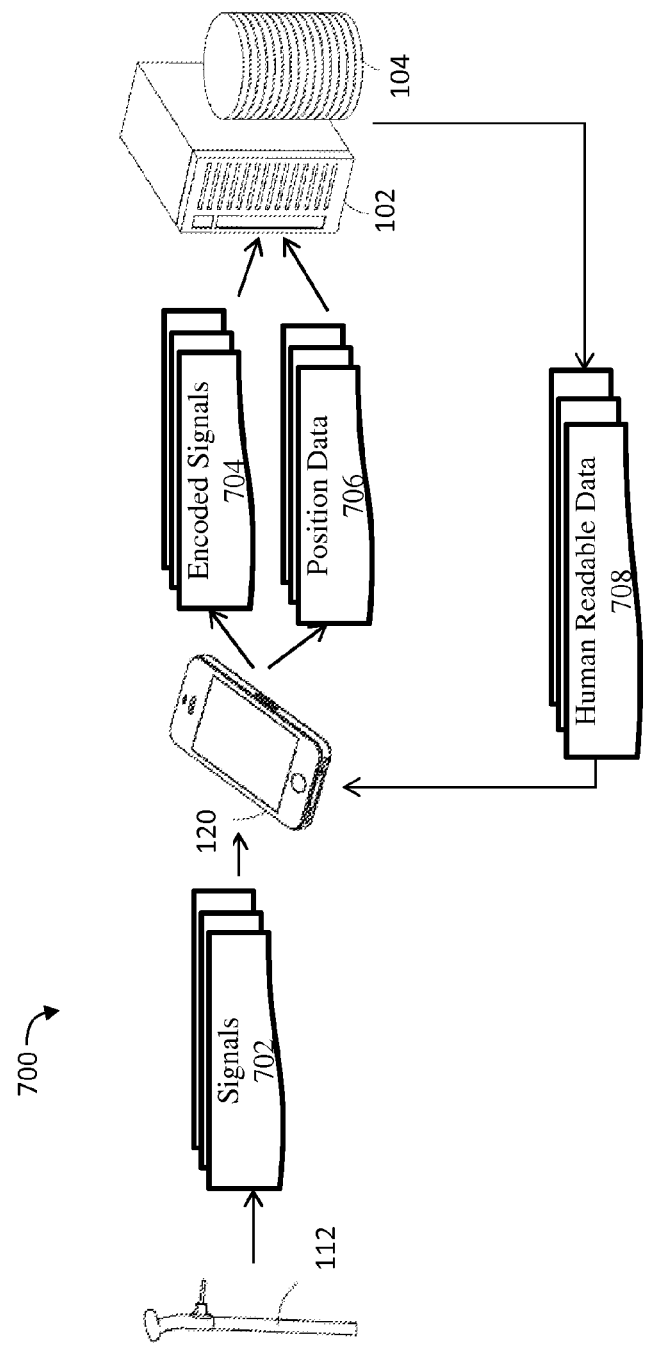
FIG. 7 is a diagram showing the data flow of the general process for detection, collection and storage of buried asset data, according to an example embodiment.
Figure 9:
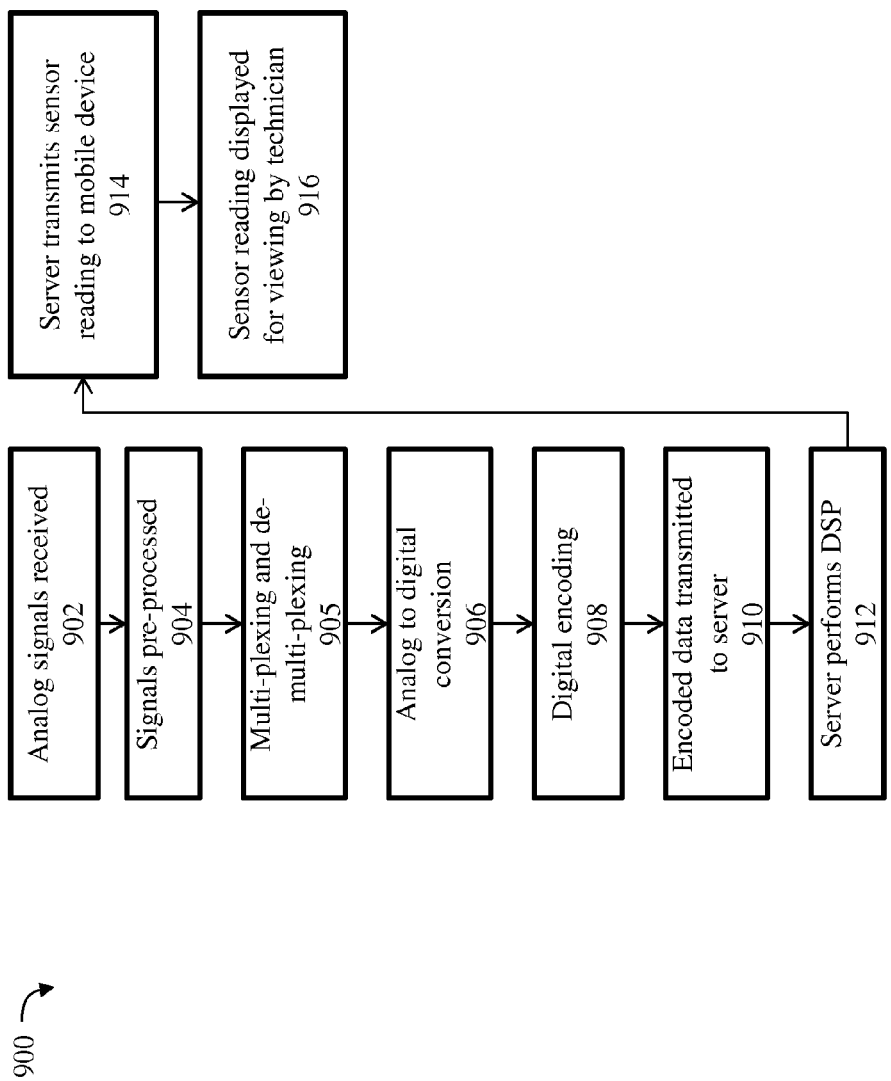
FIG. 9 is a flow chart showing the control flow of the process for detection, collection and storage of buried asset data, according to an example embodiment.

FIG. 9 is a flow chart showing the control flow of the process 900 for detection, collection and storage of buried asset data, according to an example embodiment. Process 900 describes the steps that occur when a technician 110 visits a proposed excavation site and utilizes a mobile computing device 120 and antenna array 112 to perform standard buried asset detection procedures. The process 900 is described with reference to FIG. 7, which shows the general data flow 700 of the process 900.

Process 900 starts with step 902 wherein the antenna array 112, receives raw analog signals 702 emanating from a buried asset 130. Next, in step 904, the signals 702 are pre-processed by antenna array 112, such as to increase the amplitude of the signals 702. In step 905, the pre-processed signals 702 are multiplexed (see element 618) by antenna array 112, and then the pre-processed signals are transmitted to the device 120 where the device 120 de-multiplexes (see element 620) the pre-processed signals 702.

Then, in step 906, the ADC process of device 120 converts the signals 702 into digital form. Then, in step 908, the device 120 encodes the digital form of the signals 702 for transmission over a communications network, such as network 106. In step 910, the device 120 transmits the encoded signals 704 to the server 102 over the network 106. Next, in step 912, the server 102 executes digital signal processing upon the encoded signals 704. The final result of the digital signal processing is a sensor reading or human readable data 708, which may comprise buried asset data. Subsequently, the server 102 may store the human readable data 708 in the database 104, as described below. In step 914, the server 102 transmits the human readable data 708 to the device 120 over the network 106. In step 916, the device 120 displays the human readable data 708 on a screen for the technician 110 to view.

In one embodiment, the device 120 also calculates its current position (e.g., current position data 706) and transmits it to the server 102 over network 106 (such as in step 910). In one embodiment, the device 120 calculates its current position using a Global Positioning System (GPS) receiver, which is a navigation device that receives GPS signals for the purpose of determining the device's current position on Earth. A GPS receiver, and its accompanying processor, may calculate latitude, longitude and altitude information. In this embodiment, a radio frequency signal is received from a GPS transmitter (such as a satellite) comprising a time the signal was transmitted and a position of the transmitter. Subsequently, the device 120 calculates current position data 706 of the device 120 based on the signal, and transmits the current position data 706 to the server 102 via the communications network 106. In another embodiment, the device 120 calculates its current position using alternative services, such as control plan locating, GSM localization, dead reckoning, or any combination of the aforementioned position services. In yet another embodiment, the device 120 also calculates its current compass heading (such as via the use of a compass application) and transmits this data to the server 102 over network 106. See the data flow 800 below for a description of how the server 102 processes the position data 706 and responds to the device 120.

Note that one of the advantages of the process 900 is the ability of the system to transfer the burden of the DSP process 912 to the server 102, by leveraging the wide availability of mobile broadband access via mobile phone today. This reduces the required processing capability, and therefore the cost, of the device 120. Further, having the DSP process 912 occur on the server 102 allows the DSP process 912 to be updated and optimized over time, while still making it available to the device 120. This reduces or eliminates the chances that the systems 200-400 become quickly outdated.

Figure 8:
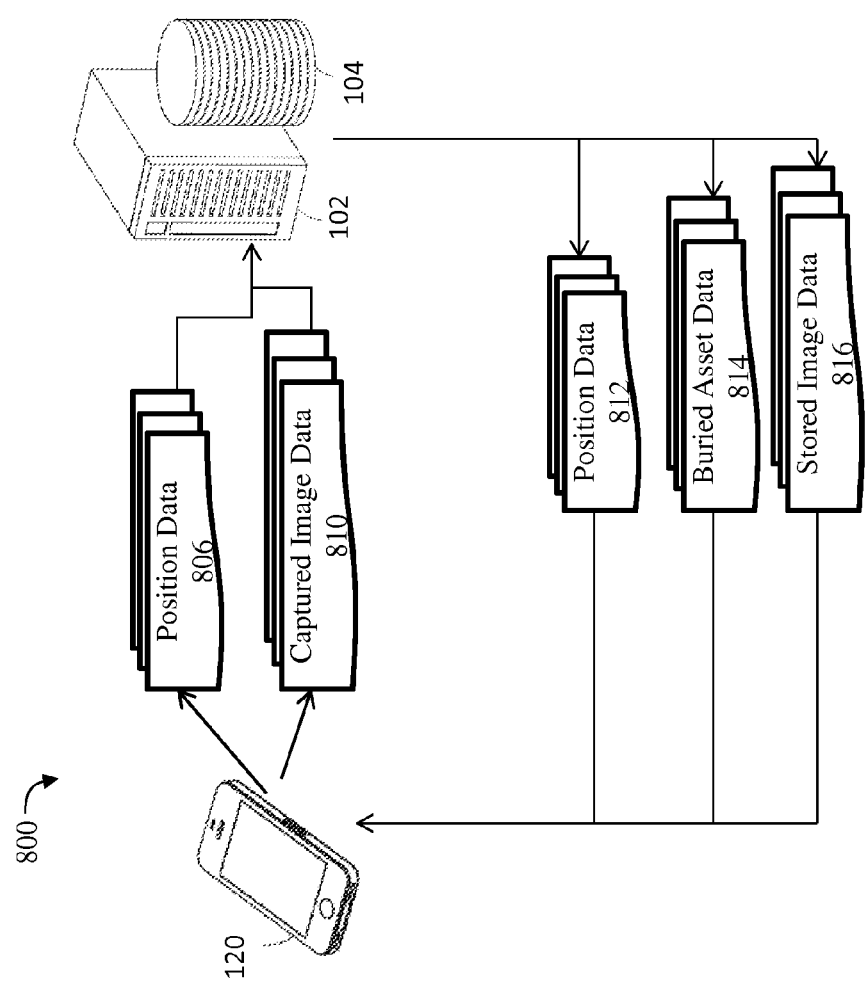
FIG. 8 is a diagram showing the general data flow of a process for collection, storage and recall of buried asset data on a server communicatively coupled with a communications network, according to an example embodiment.

FIG. 8 is a diagram showing the general data flow of a process 800 for collection, storage and recall of buried asset data on a server 102 communicatively coupled with a communications network 106, according to an example embodiment. Process 800 describes the steps that occur when a technician 110 visits a proposed excavation site and utilizes a mobile computing device 120 and antenna array 112 to perform standard buried asset detection procedures. The data flow 800 may apply to systems 200-400.

Process 800 shows that device 120 calculates its current position (e.g., current position data 806) and transmits it to the server 102. Next, the server 102 receives the current position data 806 (and any other data transmitted by device 120) and accesses any location records in its database 104 that correspond to the current position data 806 or within a margin of error of the current position data 806. If any such location records are found, the server 102 transmits the one or more location records to the device 120 over the network 106. As explained above, each location record may include position data 812, buried asset data 814 and stored image data 816. The device 120 receives the location records and may display them for the technician 110 on a display of device 120 via, for example, one or more graphical user interfaces.

In parallel to the set of steps described above for process 800, the device 120 may read a live, current or captured image 810 of the physical area of the device 120 from an optical sensor of the device 120, such as a camera. The device 120 may display the captured image simultaneously with the stored image 816 described above.

Figure 10:
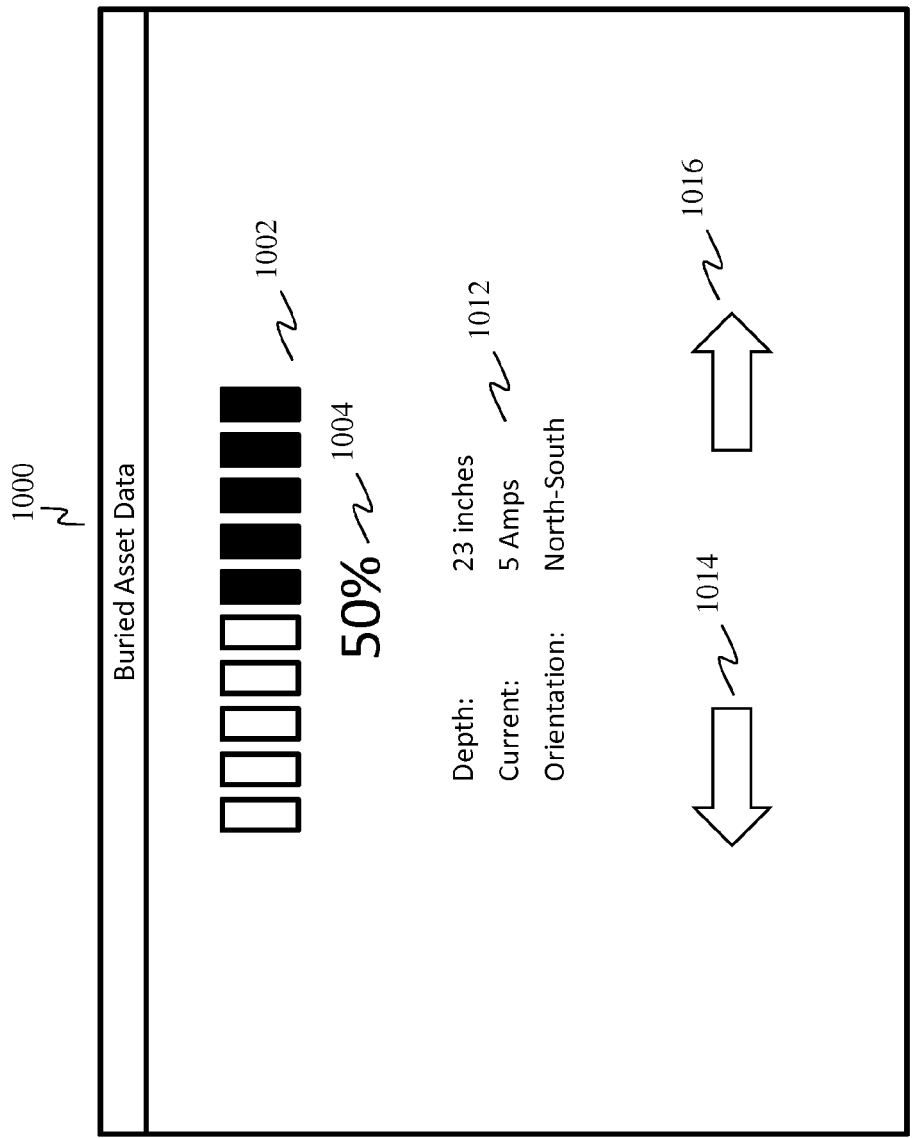
FIG. 10 is an illustration of a graphical user interface that displays data associated with the detection of buried asset data, according to an example embodiment.

FIG. 10 is an illustration of a graphical user interface 1000 that displays data associated with the detection of buried asset data, according to an example embodiment. The graphical user interface 1000 may apply to systems 200-400. The interface 1000 may display buried asset data 1012, also known as the sensor readings 512, 708. Recall that buried asset data may include depth, position, electrical signal measurement (such as current, resistance, impedance, magnitude, frequency, voltage, etc.), direction and orientation.

Interface 1000 may also include a graphic 1002 that indicates the signal strength of the buried asset being detected (such as a meter reading comprising ten bars), and a numerical indicator 1004 that indicates the signal strength of the buried asset being detected. In one embodiment, the device 120 receives human readable buried asset data 708 in step 916 and based on the data received, the device 120 calculates the appropriate graphic 1002 or numerical indicator 1004 to display in interface 1000. For example, if device 120 receives human readable buried asset data indicating 50% signal strength, the device 120 calculates the appropriate graphic 1002 to display in interface 1000 is five out of ten bars, which graphically indicates 50%.

Lastly, the interface 1000 may also include left and right arrows 1014, 1016, which points the technician 110 in the direction of the location of the buried asset being detected. Left and right arrows 1014, 1016, may additionally indicate to the technician 110 the direction in which the system 200-400 should be moved in order to read increased signal strength from of the buried asset being detected.

Figure 11:
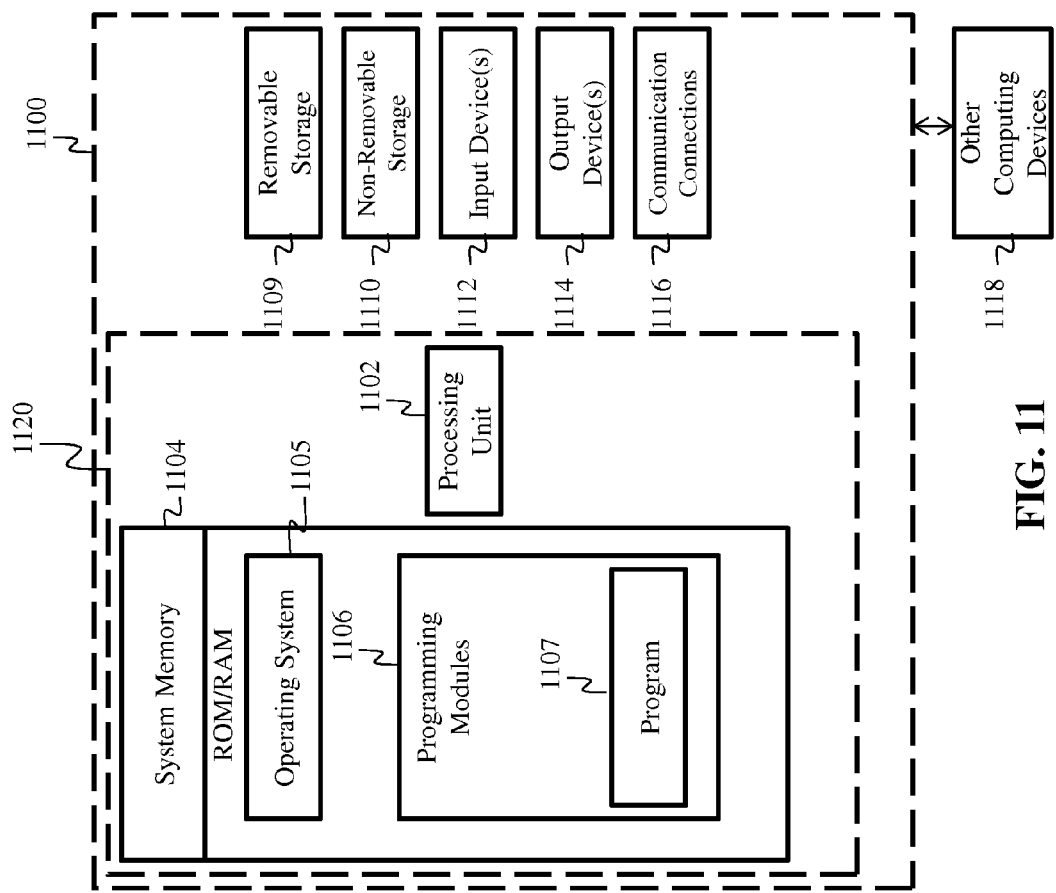
FIG. 11 is a block diagram of a system including a computing device, according to an example embodiment.

FIG. 11 is a block diagram of a system including an example computing device 1100 and other computing devices. Consistent with the embodiments described herein, the aforementioned actions performed by server 102, device 120, and antenna array 112 may be implemented in a computing device, such as the computing device 1100 of FIG. 11. Any suitable combination of hardware, software, or firmware may be used to implement the computing device 1100. The aforementioned system, device, and processors are examples and other systems, devices, and processors may comprise the aforementioned computing device. Furthermore, computing device 1100 may comprise an operating environment for systems 200-400 and process 900, as described above. Process 900 may operate in other environments and are not limited to computing device 1100.

With reference to FIG. 11, a system consistent with an embodiment of the invention may include a plurality of computing devices, such as computing device 1100. In a basic configuration, computing device 1100 may include at least one processing unit 1102 and a system memory 1104. Depending on the configuration and type of computing device, system memory 1104 may comprise, but is not limited to, volatile (e.g. random access memory (RAM)), non-volatile (e.g. read-only memory (ROM)), flash memory, or any combination or memory. System memory 1104 may include operating system 1105, and one or more programming modules 1106. Operating system 1105, for example, may be suitable for controlling computing device 1100's operation. In one embodiment, programming modules 1106 may include, for example, a program module 1107 for executing the actions of server 102, and device 120. Furthermore, embodiments of the invention may be practiced in conjunction with a graphics library, other operating systems, or any other application program and is not limited to any particular application or system. This basic configuration is illustrated in FIG. 11 by those components within a dashed line 1120.

Computing device 1100 may have additional features or functionality. For example, computing device 1100 may also include additional data storage devices (removable and/or non-removable) such as, for example, magnetic disks, optical disks, or tape. Such additional storage is illustrated in FIG. 11 by a removable storage 1109 and a non-removable storage 1110. Computer storage media may include volatile and non-volatile, removable and non-removable media implemented in any method or technology for storage of information, such as computer readable instructions, data structures, program modules, or other data. System memory 1104, removable storage 1109, and non-removable storage 1110 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1100. Any such computer storage media may be part of device 1100. Computing device 1100 may also have input device(s) 1112 such as a keyboard, a mouse, a pen, a sound input device, a camera, a touch input device, etc. Output device(s) 1114 such as a display, speakers, a printer, etc. may also be included. The aforementioned devices are only examples, and other devices may be added or substituted.

Computing device 1100 may also contain a communication connection 1116 that may allow device 1100 to communicate with other computing devices 1118, such as over a network in a distributed computing environment, for example, an intranet or the Internet. Communication connection 1116 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules and data files may be stored in system memory 1104, including operating system 1105. While executing on processing unit 1102, programming modules 1106 (e.g. program module 1107) may perform processes including, for example, one or more of the stages of the process 900 as described above. The aforementioned processes are examples, and processing unit 1102 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip (such as a System on Chip) containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the invention.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system for generating buried asset data, the system comprising a mobile computing device and a remote server, both communicatively coupled with a communications network, wherein the system is configured for:
    reading, by the mobile computing device, from one or more sensors communicatively coupled with the mobile computing device, a plurality of analog radio frequency signals from a buried asset, wherein the plurality of analog radio frequency signals are unique to the buried asset in a current position of the one or more sensors;
    amplifying, by the mobile computing device, the plurality of analog signals so as to increase amplitude of the analog signals;
    converting, by the mobile computing device, the plurality of analog signals to a plurality of digital signals unique to the buried asset in the current position of the one or more sensors;
    encoding, by the mobile computing device, the plurality of digital signals for transmission over the communications network, so as to produce a plurality of encoded digital signals;
    transmitting, by the mobile computing device, the plurality of encoded digital signals to the server via the communications network;
    receiving, by the server, from the mobile computing device via the communications network, the plurality of encoded digital signals;
    decoding, by the server, the plurality of encoded digital signals so as to produce the plurality of digital signals;
    executing, by the server, digital signal processing algorithms upon the plurality of digital signals so as to produce buried asset data, including position, depth measurement data and electrical current measurement data, for the buried asset, and wherein the buried asset data corresponds to the plurality of radio frequency analog signals unique to the buried asset in the current position of the one or more sensors;
    transmitting, by the server, to the mobile computing device via the communications network, the buried asset data;
    receiving, by the mobile computing device, from the server via the communications network, the buried asset data including position, depth measurement data and electrical current measurement data for the buried asset; and
    displaying, by the mobile computing device, the buried asset data from the server in a graphical user interface of the mobile computing device.

2. The system of claim 1, wherein the step of amplifying the plurality of analog signals further comprises:
    performing, by the mobile computing device, a pre-amplification process upon the plurality of analog signals in preparation for the amplifying step.

3. The system of claim 2, wherein the step of amplifying the plurality of analog signals further comprises:
    performing, by the mobile computing device, a filtering process upon the plurality of analog signals so as to remove noise.

4. The system of claim 3, wherein the step of executing digital signal processing algorithms further comprises:
    executing, by the server, digital signal processing algorithms upon the plurality of digital signals so as to produce buried asset data, including orientation, position, depth measurement data and electrical current measurement data, for one or more buried assets, and wherein the buried asset data corresponds to the plurality of analog signals that were read.

5. The system of claim 4, wherein the step of displaying the buried asset data further comprises:
    generating, by the mobile computing device, a graphic corresponding to a magnitude of one of the buried asset data; and
    displaying the graphic in the graphical user interface of the mobile computing device.

6. A system for generating buried asset data, the system comprising an antenna array, a mobile computing device and a remote server, wherein the mobile computing device and the remote server are communicatively coupled with a communications network, wherein the system is configured for:
    reading, by the antenna array communicatively coupled with the mobile computing device, a plurality of analog radio frequency signals from a buried asset, wherein the plurality of analog radio frequency signals are unique to the buried asset in a current position of the one or more sensors;
    amplifying, by the antenna array, the plurality of analog signals so as to increase amplitude of the analog signals;
    multiplexing, by the antenna array, the plurality of analog signals so as to transmit the plurality of analog signals over a single channel to the mobile computing device;
    de-multiplexing, by the mobile computing device, the plurality of analog signals transmitted over the single channel by the antenna array;

converting, by the mobile computing device, the plurality of analog signals to a plurality of digital signals unique to the buried asset in the current position of the one or more sensors;

encoding, by the mobile computing device, the plurality of digital signals for transmission over the communications network, so as to produce plurality of encoded digital signals;

transmitting, by the mobile computing device, the plurality of encoded digital signals to the server via the communications network;

receiving, by the server, from the mobile computing device via the communications network, the plurality of encoded digital signals;

decoding, by the server, the plurality of encoded digital signals so as to produce the plurality of digital signals;

executing, by the server, digital signal processing algorithms upon the plurality of digital signals so as to produce buried asset data, including position, depth measurement data and electrical current measurement data, for the buried asset, and wherein the buried asset data corresponds to the plurality of analog radio frequency signals unique to the buried asset in the current position of the one or more sensors;

transmitting, by the server, to the mobile computing device via the communications network, the buried asset data;

receiving, by the mobile computing device, from the server via the communications network, the buried asset data including position, depth measurement data and electrical current measurement data for the buried asset; and displaying, by the mobile computing device, the buried asset data from the server in a graphical user interface of the mobile computing device.

7. The system of claim 6, wherein the step of amplifying the plurality of analog signals further comprises:

performing, by the antenna array, a pre-amplification process upon the plurality of analog signals in preparation for the amplifying step.

8. The system of claim 7, wherein the step of amplifying the plurality of analog signals further comprises:

performing, by the antenna array, a filtering process upon the plurality of analog signals so as to remove noise.

9. The system of claim 8, wherein the step of executing digital signal processing algorithms further comprises:

executing, by the server, digital signal processing algorithms upon the plurality of digital signals so as to produce buried asset data, including orientation, position, depth measurement data and electrical current measurement data, for one or more buried assets, and wherein the buried asset data corresponds to the plurality of analog signals that were read.

10. The system of claim 9, wherein the step of displaying the buried asset data further comprises:

generating, by the mobile computing device, a graphic corresponding to a magnitude of one of the buried asset data; and displaying the graphic in the graphical user interface of the mobile computing device.

11. A system for generating buried asset data, the system comprising:

an antenna array configured for reading a plurality of analog radio frequency signals from a buried asset, wherein the plurality of analog radio frequency signals are unique to the buried asset in a current position of the one or more sensors, for amplifying the plurality of analog signals so as to increase amplitude of the analog signals, for converting the plurality of analog signals to a plurality of digital signals unique to the buried asset in the current position of the one or more sensors, the plurality of digital signals for transmission to a mobile computing device and transmitting the plurality of digital signals to the mobile computing device, a mobile computing device configured for encoding the plurality of digital signals for transmission over the communications network, so as to produce plurality of encoded digital signals, and for transmitting the plurality of encoded digital signals to a server via the communications network;

a remote server configured for receiving, from the mobile computing device via the communications network, the plurality of encoded digital signals, for decoding, by the server, the plurality of encoded digital signals so as to produce the plurality of digital signals, for executing, by the server, digital signal processing algorithms upon the plurality of digital signals so as to produce buried asset data, including position, depth measurement data and electrical current measurement data, for the buried asset, and wherein the buried asset data corresponds to the plurality of analog radio frequency signals unique to the buried asset in the current position of the one or more sensors, and for transmitting, by the server, to the mobile computing device via the communications network, the buried asset data; and wherein the mobile computing device is further configured for receiving, from the server via the communications network, the buried asset data including position, depth measurement data and electrical current measurement data for the buried asset, and configured for displaying the buried asset data from the server in a graphical user interface.

12. The system of claim 11, wherein the antenna array is communicatively coupled with the mobile computing device.

13. The system of claim 12, wherein the antenna array is communicatively coupled with the mobile computing device via a dock connector port of the mobile computing device.

14. The system of claim 12, wherein the antenna array is communicatively coupled with the mobile computing device via a TRRS connector port of the mobile computing device.

15. The system of claim 12, wherein the antenna array is communicatively coupled with the mobile computing device via a wireless radio frequency connection.

16. The system of claim 11, the antenna array further comprising a multiplexer for multiplexing the plurality of analog signals so as to transmit the plurality of analog signals over a single channel to the mobile computing device.

17. The system of claim 16, the mobile computing device further comprising a de-multiplexer for de-multiplexing the plurality of analog signals transmitted over the single channel.

* * * * *